June 27, 1967 T. P. SYLVAN 3,328,652

VOLTAGE COMPARATOR

Filed July 20, 1964

INVENTOR:
TAGE P. SYLVAN,

BY Urban L. Kaubion
HIS ATTORNEY.

United States Patent Office 3,328,652

Patented June 27, 1967

3,328,652

VOLTAGE COMPARATOR

Tage P. Sylvan, Liverpool, N.Y., assignor to General Electric Company, a corporation of New York Filed July 20, 1964, Ser. No. 383,836
8 Claims. (Cl. 317—235)

Figures 1, 2, 3:
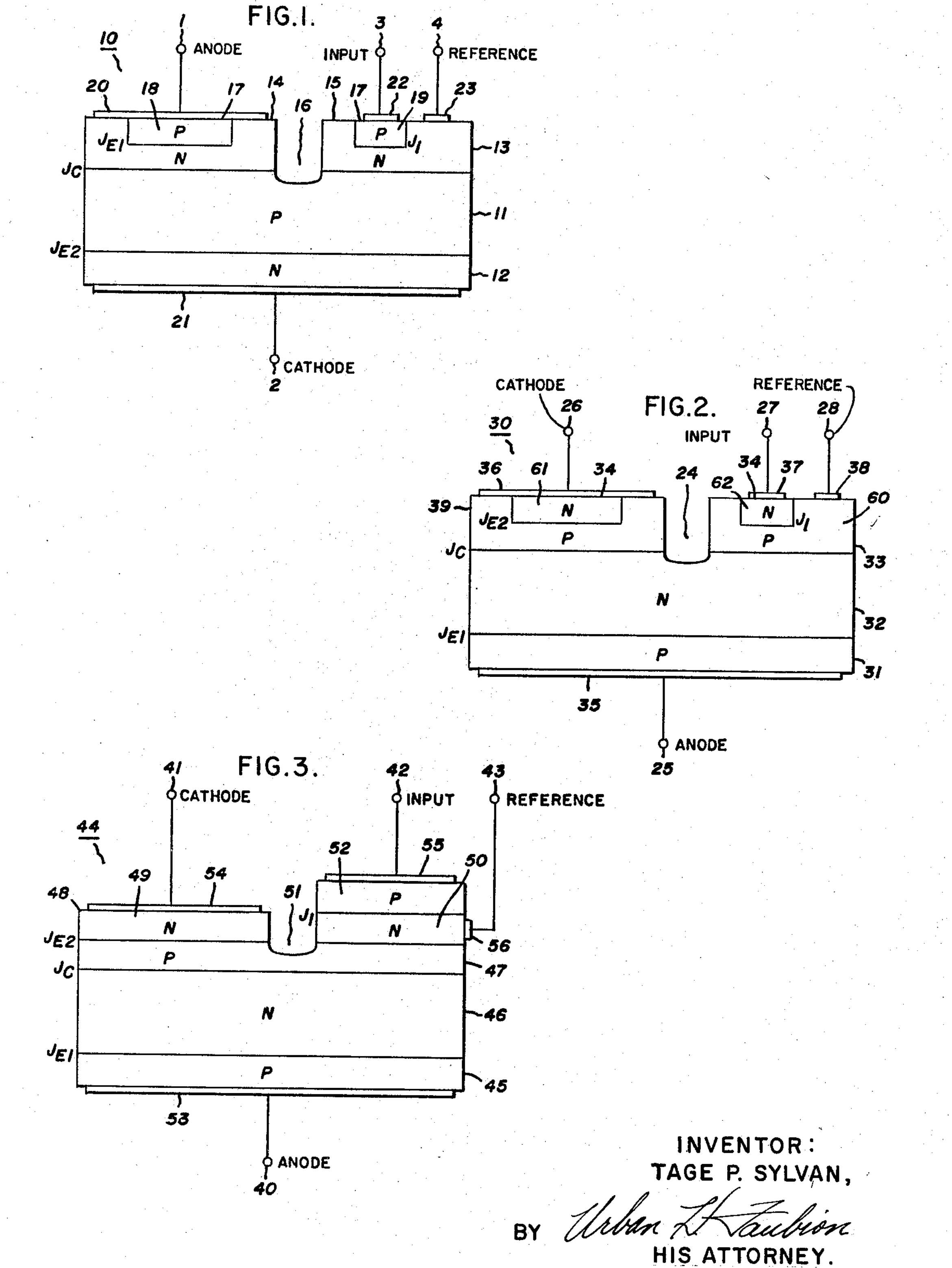

This invention relates to semiconductor switch structures which perform the dual functions of comparing two voltages and switching in response to a difference between them. In other words, the invention relates to comparator switch structures wherein a switching trigger pulse is generated in response to a difference between compared voltages to change the state of the structure between a high and low impedance state.

Power to a load in a wide range of industrial applications is controlled in response to the relative magnitudes of two or more voltages. In general, this type control requires a voltage comparator to sense a difference in relationships of the compared voltages and a switching device which controls power to the load. Most usually, the comparator generates an output in response to a sensed variation of voltage relationships and the switch is connected to respond to such an output. Thus, the switch responds to the comparator output to control the load.

The combined functions of switch and comparator trigger may be accomplished by relatively complex electrical circuits employing many circuit components. For example, a transistor or vacuum tube Schmitt trigger can be used for a comparator (with a power supply) and a relay of silicon controlled rectifier (SCR) can be used for the switch.

It is an object of this invention to provide a semiconductor comparator switch which can perform the functions of a variable voltage triggering device.

For optimum performance and usefulness, a comparator trigger switch should satisfy the following requirements:

(1) Have electrical isolation between terminals of the comparator and those of the switch in the sense that minimal restrictions are imposed upon relative voltages between the terminals of the comparator and those of the switch, (2) The input impedance of the comparator should be high at terminals where voltages are applied for comparison before switching takes place in order to minimize the current required for changing the state of the switch (switching or triggering) and make the triggering function essentially independent of the circuits from which the compared voltages are taken, (3) The difference between compared voltages required to trigger the switch should be as low as possible, uniform from one circuit (or device) to another and stable with temperature and life, (4) The switch should be capable of handling a wide range of voltage and current and should have a high impedance in the "off" state and a low impedance in the "on" state, (5) The operating speed of the circuit (or device) should be as fast as possible.

Accordingly, it is an object of this invention to provide a single unitary solid state comparator switch having the above-listed attributes.

In carrying out the present invention, a semiconductor voltage comparator switch having two switch terminals and two comparator terminals is provided utilizing a body of semiconductor material having a plurality of alternating regions of opposite conductivity type separated by rectifying junction. The configuration of the body is such that the terminals of the switch portion are separated by four regions and three junctions for conduction purposes whereby the center of the three junctions is reverse biased when the switch portion is non-conductive and the comparator terminals of said device are connected to two adjacent regions not common to the conduction path between the switch terminals but one region of which is in rectifying contact with a region of the switch portion which is adjacent the center of the three junctions whereby a voltage difference of the proper magnitude and sense between comparator terminals causes carrier injection into the contacted region of the switch with consequent firing.

The features which are believed to be characteristic of the invention are set forth with particularity in the appended claims. The invention itself, however, both as to its organization and advantages thereof may best be understood by reference to the following description taken in connection with the accompanying drawings in which:

FIGURES 1, 2, and 3 are diagrammatic sectional views of four-lead semiconductor comparator switch devices constructed in accordance with principles of this invention.

One embodiment of a practical comparator switch constructed in accordance with principles of the invention is illustrated somewhat schematically in FIGURE 1. As illustrated, the device has four terminals 1, 2, 3 and 4 which are intended to be connected in the circuit where the device is employed. The upper and lower main current carrying terminals 1 and 2 (referred to as anode and cathode respectively) are connected in a main current carrying path of the circuit where switching is to take place. Input and reference terminals 3 and 4 respectively are connected to voltage sources to be compared. The switch is considered turned on when the current path between anode and cathode terminals 1 and 2 is highly conductive and off when a high impedance is presented between these terminals. When upper main terminal 1 is positive relative to lower main terminal 2, the device is turned on when a voltage is applied at input terminal 3 which is positive relative to the reference terminal 4. When the reverse polarity is applied between main terminals 1 and 2 or when the reference terminal 4 is positive relative to or at equal potential with input terminal 3, the device will not turn on.

In the embodiment illustrated in FIGURE 1, the semiconductor pellet 10 may be considered a four-layer device and has an internal P conductivity type base region or layer 11 and N conductivity type regions or layers 12 and 13 on opposite sides. Lower P type layer constitutes an emitter, therefore, the junction $J_{E2}$ formed between the two adjacent layers is referred to as the lower or cathode emitter junction. The upper N type layer 13 forms the center or collector junction $J_C$ with the internal P type layer 11. Notice that the upper N type layer 13 (referred to as upper base layer) is divided into two individual parts 14 and 15 by an intervening kerf 16 which may be etched or cut. The kerf 16 assures electrical isolation between the parts 14 and 15 of the N type layer 13 and electrical connections made to these parts. The fourth layer 17 is of P conductivity type material and is made up of two parts 18 and 19 (upper emitters) which make rectifying contact with parts 14 and 15 respectively of upper internal base layer 13. Since upper (terminal) P type portion 18 (anode emitter) forms the emitter for the main switch, the junction $J_{E1}$ it forms with adjacent N type emitter 14 is called the main or anode emitter junction. Since the upper or terminal portion 19 forms the emitter for the comparator portion of the switch, the junction $J_I$ it forms with the adjacent N type base portion 14 is called the input junction. As illustrated, the upper emitters 18 and 19 are formed in the adjacent base layer 13 in such a way that both layers have a common exposed upper surface. This is done for convenience in making contacts to the body 10.

Anode, cathode, input and reference terminals 1, 2, 3 and 4 respectively are connected to the semiconductor pellet 10 by means of low resistance ohmic contacts or electrodes 20, 21, 22 and 23 respectively. Anode and reference contacts 20 and 22 respectively are formed on upper P type anode and input emitters 18 and 19 respectively. The cathode contact 21 is formed on the lower emitter region 12. The device configuration described thus far may be considered that of two four layer diodes of like polarity in composite configuration. That is, the four layers 17, 13, 11 and 12 and three intermediate junctions $J_{E1}$, $J_C$ and $J_{E2}$ between anode and cathode electrodes 20 and 21 constitutes one such diode and the same four layers and three junctions $J_I$, $J_C$ and $J_{E2}$ between input electrode 22 and cathode electrode 21 constitutes another diode. The diodes are composite in that they are part of the same semiconductor body 10 but the fact that upper emitter and base layers 17 and 13 are divided into two parts isolates electrical connections to these upper layers.

Anode contact 20, in the embodiment illustrated, also contacts the adjacent internal N type base layer to short the upper emitter junction $J_{E1}$. The shorted emitter is not essential to device operation but has many advantages. This feature is described and claimed in the copending patent application, Ser. No. 838,504, entitled Semiconductor Devices and Methods of Making Same, filed September 8, 1959 in the name of Nick Holonyak, Jr., and Richard W. Aldrich and assigned to the assignee of the present application. Further, the lower emitter junction $J_{E2}$ may be shorted instead of the upper emitter junction $J_{E1}$ as shown. However, if the shorted emitter feature is used on either junction, it should be placed as far away from the input emitter junction $J_I$ as possible in order to assure proper device operation.

Reference contact 23 is in low resistance ohmic contact with the part 15 of upper N type base layer 13 (input base region) which is adjacent the input emitter region 19. Thus, a two layer diode is formed between reference and input terminals 4 and 3.

In order to understand the device operation, it may be best to consider the anode to cathode PNPN structure as a controlled rectifier with the combination of the input and reference terminals 3 and 4 acting to supply the gate signal. Detailed analysis of controlled rectifier operation is not given here since it is well known. For example, operation of the controlled rectifier is described in Chapter 1 of the General Electric Controlled Rectifier Manual, second edition, copyright 1961 by the General Electric Company, the article by Moll, Tanenbaum, Goldey and Holonyak in Proceedings of the IRE, September 1956, volume 44, pages 1174 to 1182, and in the copending patent application of Nick Holonyak, Jr., and Richard W. Aldrich, supra. However, it is believed that a limited description of controlled rectifier action is in order here.

Consider first the four layer diode portion of the device between main anode and cathode terminals 1 and 2. When anode terminal 1 is negative with respect to cathode terminal 2, the two P-N junctions $J_{E1}$ and $J_{E2}$ nearest the terminals become reverse biased and the center P-N junction $J_C$ becomes forward biased; thus, a high impedance is presented between the terminals. If a sufficiently large potential is applied between the terminals, the two P-N junctions nearest the terminals break down and conduct current in the reserve direction. When a voltage of the opposite polarity is applied between the main terminals 1 and 2, the two P-N junctions $J_{E1}$ and $J_{E2}$ nearest the terminals become forward biased and the center P-N junction $J_C$ becomes reverse biased; thus, a high impedance is again presented between the terminals. However, if the potential applied between the terminals 1 and 2 is increased sufficiently, or if the proper carrier current is injected into cathode base layer or region 11 (or base region 14), not only does the center P-N junction break down, but reverses in polarization and a very low impedance is presented between the main terminals 1 and 2.

The two avalanche breakdown modes of device operation described above are not generally contemplated for the comparator switch; the base current injection or gate firing mode is. Thus, the requirement for operation of the device of FIGURE 1 in the mode intended is that the relative potentials of the input and reference terminals 3 and 4 be such that carriers are injected into lower base layer 11 when anode terminal 1 is positive relative to cathode terminal 2.

Assume input terminal 3 positive (as well as anode terminal 1) relative to cathode terminal 2, center junction $J_C$ is reverse biased and the input portion of the device does not provide the gate firing injection into base layer 11. If a voltage is applied to input terminal 3 which is less than that applied at reference terminal 4, both the center junction $J_C$ and the input emitter junction are reverse biased and the device will not turn on (anode to cathode 2).

In order to turn the device on, the voltage applied potential of input terminal must be higher than that at reference terminal. For this condition, the input emitter junction $J_I$ is forward biased and carriers (holes here) injected across this junction diffuse into lower base layer 11. Once this action starts, the triggering or turn on action takes place for the anode 1 to cathode 2 PNPN just as in a conventional controlled rectifier and the anode to cathode impedance becomes quite low.

This device meets all the criteria for a comparator switch as listed previously. The dual (or complementary structure) of the structure of FIGURE 1 is illustrated in FIGURE 2. By "dual" we mean that the structure is identical but the conductivities of the corresponding regions of the two devices are of opposite types. Since the structures in the two figures are so similar, only a brief description of FIGURE 2 is given here. For the device of FIGUURE 2, the anode terminal is lower terminal 25 and cathode terminal is upper terminal 26 and input and reference terminals 27 and 28 respectively are provided at the "cathode" side of the device in the same relation to each other that they appear in FIGURE 1.

Starting from the lower layer and going up (in the figure) the PNPN layers are given reference numerals 31, 32, 33 and 34 respectively and the junctions formed between the layers are given the characters $J_{E1}$, $J_C$, $J_{E2}$, $J_I$ as before. Again, the subscripts "E" designate emitters, "I" designates input emitter and "C" stands for "center" or "collector." Again, the upper two layers, i.e. P and N type layers 33 and 34, are divided by a kerf 24 for purposes of isolation. Thus, upper internal base layer 33 is divided into a switch base region 39 in the current path between main switch terminals 25 and 26 and a reference region 60 which forms part of the comparator diode. The upper switch emitter 61 is formed by the part of N type layer adjacent switch base region 39 and the input emitter region 62 is formed adjacent the upper P type reference region 60. The anode, cathode, input and reference electrodes are numbered 35, 36, 37 and 38 respectively and are formed on the anode emitter 31, cathode emitter 61, comparator emitter 62 and comparator base 60 respectively.

The principles of operation of the device of FIGURE 2 are the same as those of FIGURE 1 but voltage relationships are different. Again (as implied by the names), for the device to operate in the gate firing mode, the anode must be positive relative to the cathode. However, for this embodiment, the reference terminal 28 must be positive relative to the input terminal 27 for injection into the base layer 32 from the input emitter 62. Again, injection from input emitter 62 into base layer 32 causes the device to switch or turn on.

The comparator switch of FIGURE 3 has anode and cathode terminals 40 and 41 respectively and input and reference terminals 42 and 43 respectively. The semiconductor body 44 of the device has four layers 45, 46, 47 and 48 between anode and cathode terminals as in the previously described embodiments. As in the embodiments of FIGURE 2, the layers reading up from the bottom are PNPN and the junctions between layers are designated by reference characters $J_{E1}$, $J_C$ and $J_{E2}$, respectively. The subscripts have same connotation previously used. Thus, this part of the device acts as a four layer diode or as a controlled rectifier if a triggering current is injected at either of the internal base layers (P type base 47 or N type base layer 46) adjacent the center or collector junction $J_C$.

In this embodiment, a triggering injection mechanism which is different from those previously used is employed. This arrangement has the advantage of superior electrical isolation and a slight disadvantage in that operation as a comparator constratins the voltage applied to reference terminal 43 to values which are positive relative to the voltage at cathode terminal 41. This is a slight limitation, however, since a complementary device (the dual) may be used for operation where it is desired to have the reference terminal 43 negative relative to cathode 41.

Isolation is provided between comparator and switch portions of the device by dividing upper N type layer 48 into cathode and reference portions 49 and 50 by a kerf 51. In order to provide the comparator function, an upper input terminal layer 52 of P conductivity type is provided adjacent reference layer 50 and forms the input emitter junction $J_I$ therewith. The anode, cathode, input and reference terminals 40, 41, 42 and 43 respectively are connected to lower emitter layer 45, upper emitter layer portion 49, upper input emitter layer 52 and reference layer 50 by ohmic contacts 53, 54, 55 and 56 respectively.

Assume anode terminal 40 and reference terminal 43 both positive relative to cathode terminal 41, and input terminal 42 positive relative to reference terminal 43. Under these circumstances, input emitter 52 injects hole current into reference portion 50 of N type layer 48. Carriers diffuse across into internal P type base layer 47 which causes the device to turn on as a controlled rectifier just as previously described.

These devices can all be made using conventional diffusion and alloy techniques along with conventional masking techniques for pellet fabrication. Consequently, these techniques are not described here.

Many minor modifications in device structures and means of obtaining the structures can be proposed while not departing from the present invention. Thus, while particular embodiments are illustrated, the invention is not limited thereto. It is contemplated that the appended claims will cover such modifications as fall within the true spirit and scope of the invention.

What I claim as new and desire to secure by Letters Patent of the United States is:

1. A voltage comparator switching device including a semiconductor body having a plurality of alternating regions of opposite conductivity type separated by rectifying junctions, said regions being arranged in composite configuration equivalent to a pair of diodes, a common terminal region and an adjacent common intermediate region respectively which regions constitute a part of both of said pair of diodes of said composite configuration, each of said diodes having a separate individual terminal region and a separate individual intermediate region each of which are not common to both said pair of diodes, each of said separate individual intermediate regions forming a separate rectifying junction at spaced portions of the said common intermediate region whereby any path between said two separate individual intermediate regions will pass at least two different rectifying junctions, individual terminal electrodes each in low resistance ohmic contact with a different one of said terminal regions, and a single reference electrode in low resistance ohmic contact with one of said separate individual intermediate regions.

2. A comparator circuit including in combination, a body of semiconductor material having a plurality of alternating regions of opposite conductivity type separated by rectifying junctions, anode and cathode electrodes in ohmic contact with external regions of said body of semiconductor material whereby four of said alternating regions and three rectifying junctions are in series circuit relation therebetween, an input electrode in ohmic contact with an external region of said semiconductor body remote from the external regions contacted by said anode and cathode electrodes whereby four of said alternating regions and three rectifying junctions are in series circuit relation between said input and cathode electrodes, only two of said four regions in series relation between said anode and cathode electrodes also constituting an external region and an adjacent internal region of said four alternating regions in series circuit relation between said input and cathode electrodes, and a reference electrode in ohmic contact with an intermediate one of said alternating regions of said semiconductor body which is adjacent the external region contacted by said input electrode.

3. A voltage comparator switching device including a semiconductor body having a plurality of alternating regions of opposite conductivity type separated by rectifying junctions, said regions being arranged in a composite configuration equivalent to a pair of diodes of like polarity, a common terminal region and an adjacent common intermediate region respectively which regions constitute a part of both of said pair of diodes of said composite configuration, each of said diodes having a separate individual terminal region and a separate individual intermediate region which are not common to both said pair of diodes, each of said separate individual intermediate regions forming a separate rectifying junction at spaced portions of the said common intermediate region whereby any path between said two separate individual intermediate regions will pass at least two different rectifying junctions, individual terminal electrodes each in low resistance ohmic contact with a different one of said terminal regions, and a single reference electrode in low resistance ohmic contact with one of said separate intermediate regions.

4. A voltage comparator switching device including a semiconductor body having a plurality of alternating regions of opposite conductivity type separated by rectifying junctions, said regions being arranged in a composite configuration equivalent to a pair of diodes of like polarity, a common terminal region and an adjacent common intermediate region respectively which regions constitute a part of both of said pair of diodes of said composite configuration, each of said diodes having a separate individual terminal region and a separate individual intermediate region which are not common to both said pair of diodes, each of said separate individual intermediate regions forming a separate rectifying junction at spaced portions of the said common intermediate region whereby any path between said two separate individual intermediate regions will pass at least two different rectifying junctions, a shorting contact in ohmic contact with a portion of one of said separate individual terminal regions and the adjacent one of said individual intermediate regions, an individual terminal electrode in low resistance ohmic contact with the other one of said separate individual terminal regions, and another individual terminal electrode in low resistance ohmic contact with said common terminal region and a reference electrode in low resistance ohmic contact with said separate intermediate adjacent said other one of said separate individual terminal regions.

5. A comparator device including in combination, a body of semiconductor material having a plurality of alternating regions of opposite conductivity type separated by rectifying junctions, anode and cathode electrodes in ohmic contact with remote external portion of said regions of said body of semiconductor material whereby four of said alternating regions and three rectifying junctions are in series circuit relation therebetween, an input electrode in ohmic contact with an external region of said semiconductor body remote from the external regions contacted by said anode and cathode electrodes whereby four of said alternating regions and three rectifying junctions are in series circuit relation between said input and cathode electrodes, only two of said four regions in series relation between said anode and cathode electrodes also constituting an external region and an adjacent internal region of said four alternating regions in series circuit relation between said input and cathode electrodes, and two of said four alternating regions between said input and cathode electrodes being separate and distinct from said four regions in series relation between said anode and cathode a shorting contact in ohmic contact with a portion of said external region and adjacent internal region which regions are in the said series circuit paths between anode and cathode electrodes and between input and cathode electrodes, and a reference electrode in ohmic contact with an intermediate one of said alternating regions of said semiconductor body which is adjacent the external region contacted by said input electrode.

6. A voltage comparator switching device including a body of semiconductor material having a plurality of alternating regions of opposite conductivity type separated by rectifying junctions; said regions including in sequence an external anode emitter region, an adjacent internal anode base region, an adjacent internal cathode base region, and an external cathode emitter region, a reference base region also formed adjacent said internal cathode base region of an opposite conductivity type thereto and separated from said external cathode emitter region whereby any path between said reference base region and said cathode emitter region will pass at least two different rectifying junctions, and an external input emitter region adjacent said reference base region; anode, cathode, input and reference electrodes respectively in ohmic contact with the said anode, cathode, input and reference regions thereby to provide means for electrical connections to said semiconductor body.

7. A voltage comparator switching device including a semiconductor body having a plurality of alternating regions of opposite conductivity type separated by rectifying junctions, said regions being arranged in a composite configuration equivalent to a pair of diodes, a common terminal region and at least one adjacent common intermediate region respectively which regions constitute a part of both said pair of diodes of said composite configuration, each of said diodes having a separate individual terminal region and a separate individual intermediate region which is not common to both said pair of diodes, each of said separate individual intermediate regions forming a separate rectifying junction at spaced portions of the said common intermediate region whereby any path between said two separate individual intermediate regions will pass at least two different rectifying junctions, individual terminal electrodes each in low resistance ohmic contact with a different one of said individual terminal regions, and a single reference electrode in low resistance ohmic contact with a separate individual intermediate region not common to both said pair of diodes.

8. A comparator device including in combination a body of semiconductor material having a plurality of alternating regions of opposite conductivity type separated by rectifying junctions; a portion of said body comprising four alternating regions and three rectifying junctions arranged in series circuit relation whereby two of said regions constitute external regions and two of said regions therebetween constitute internal regions; individual anode and cathode electrodes respectively each in contact with an opposite individual external one of said four regions; another portion of said body including a separate individual intermediate region in rectifying contact with one internal region of said four regions whereby any path between said separate individual internal region and one of said external regions of said four will pass at least two junctions and any path between said separate individual internal region and the other external region of said four will pass at least three junctions, and a separate individual external region only contacting said separate individual internal regions and in rectifying contact therewith; a reference electrode in contact with said separate individual internal region and an input electrode in contact with said separate individual external region.

References Cited

UNITED STATES PATENTS

| | | | |
|---|---|---|---|
| 2,936,384 | 5/1960 | White | 317—234 |
| 3,078,196 | 2/1963 | Ross | 148—33.5 |
| 3,090,873 | 5/1963 | Mackintosh. | |
| 3,124,703 | 3/1964 | Sylvan | 317—235 X |
| 3,140,963 | 7/1964 | Svedberg | 317—235 X |
| 3,189,800 | 6/1965 | Strull | 317—235 |
| 3,210,621 | 10/1965 | Strull | 317—235 |
| 3,213,339 | 10/1965 | Henkels | 317—235 |

JOHN W. HUCKERT, *Primary Examiner.*

A. M. LESNIAK, *Assistant Examiner.*

UNITED STATES PATENT OFFICE

CERTIFICATE OF CORRECTION

Patent No. 3,328,652 June 27, 1967

Tage P. Sylvan

It is hereby certified that error appears in the above numbered patent requiring correction and that the said Letters Patent should read as corrected below.

Column 1, line 31, for "of" read -- or --; column 4, line 36, for "FIGUURE" read -- FIGURE --; column 5, line 15, for "constratins" read -- constrains --; column 7, line 16, after "cathode" insert a comma.

Signed and sealed this 6th day of August 1968.

(SEAL)
Attest:

Edward M. Fletcher, Jr.
Attesting Officer

EDWARD J. BRENNER
Commissioner of Patents